(12) United States Patent
Lin et al.

(10) Patent No.: US 11,639,145 B2
(45) Date of Patent: May 2, 2023

(54) VEHICLE STRUCTURE MATERIAL STRENGTHENING SYSTEM AND VEHICLE CONTAINING SAME

(71) Applicant: NATIONAL CHENG KUNG UNIVERSITY, Tainan (TW)

(72) Inventors: Shih-Kang Lin, Tainan (TW); Yu-Chen Liu, Tainan (TW); Yu-Ching Chen, Tainan (TW); Kuan-Hsueh Lin, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 208 days.

(21) Appl. No.: 17/141,295

(22) Filed: Jan. 5, 2021

(65) Prior Publication Data
US 2022/0153219 A1 May 19, 2022

(30) Foreign Application Priority Data
Nov. 17, 2020 (TW) .................. 109140183

(51) Int. Cl.
*B60R 21/0136* (2006.01)
*B60R 21/01* (2006.01)

(52) U.S. Cl.
CPC .............. *B60R 21/0136* (2013.01); *B60R 2021/01006* (2013.01); *B60R 2021/01027* (2013.01); *B60R 2021/01211* (2013.01)

(58) Field of Classification Search
None
See application file for complete search history.

(56) References Cited

U.S. PATENT DOCUMENTS

| | | | |
|---|---|---|---|
| 6,037,674 A * | 3/2000 | Hargedon | B60R 21/017 340/436 |
| 9,827,935 B2 * | 11/2017 | Le | B60R 19/483 |
| 10,029,639 B2 * | 7/2018 | Kim | B60R 21/0134 |
| 10,737,652 B1 * | 8/2020 | Piper | B60R 21/0136 |
| 10,785,474 B1 * | 9/2020 | Semansky | G05D 1/0246 |

(Continued)

FOREIGN PATENT DOCUMENTS

| | | | | |
|---|---|---|---|---|
| CN | 105247261 B | * | 5/2017 | ............ F16K 1/221 |
| DE | 102006011687 A1 | * | 10/2006 | .......... B60R 21/017 |

(Continued)

*Primary Examiner* — Nicole T Verley
(74) *Attorney, Agent, or Firm* — Mark M. Friedman

(57) ABSTRACT

A vehicle structure material strengthening system and a vehicle containing the same are described. The vehicle structure material strengthening system has at least one collision sensor, a processor, and a power supply. The collision sensor is suitable for being mounted on the vehicle. The processor is electrically connected to the collision sensor for receiving a collision signal from the collision sensor, and determines whether to transmit a power activation signal according to the collision signal. The power supply is electrically connected to the processor and the vehicle. When the collision signal is greater than or equal to a collision threshold, the processor transmits the power activation signal to the power supply, wherein the power supply transmits a circuit to the vehicle according to the power activation signal; or when the collision signal is less than the collision threshold, the processor does not transmit the power activation signal.

18 Claims, 6 Drawing Sheets

(56) References Cited

U.S. PATENT DOCUMENTS

| | | | | |
|---|---|---|---|---|
| 10,974,675 B2* | 4/2021 | Muhammad | ........ | B60R 21/0132 |
| 2006/0232052 A1* | 10/2006 | Breed | ................ | B60R 21/0136 |
| | | | | 280/735 |
| 2008/0203814 A1* | 8/2008 | Kamiya | .............. | B60R 21/0134 |
| | | | | 307/10.1 |
| 2009/0312949 A1* | 12/2009 | Suzuki | ................ | B60R 21/0136 |
| | | | | 701/301 |
| 2020/0250901 A1* | 8/2020 | Golov | ................ | B60R 21/0136 |

FOREIGN PATENT DOCUMENTS

| | | | | | |
|---|---|---|---|---|---|
| DE | 102010015892 A1 | * | 10/2010 | ......... | H04L 25/4917 |
| FR | 2896464 A1 | * | 7/2007 | ............ | B60R 21/01 |
| JP | 2006082591 A | * | 3/2006 | ........... | B60R 21/013 |
| JP | 2017007541 A | * | 1/2017 | ............. | B60R 19/48 |
| JP | 2017214026 A | * | 12/2017 | .......... | B60R 21/015 |
| JP | 2018007471 A | * | 1/2018 | | |

* cited by examiner

VEHICLE STRUCTURE MATERIAL STRENGTHENING SYSTEM AND VEHICLE CONTAINING SAME

CROSS REFERENCE TO RELATED APPLICATION

This application claims priority to Taiwan Patent Application No. 109140183, filed on Nov. 17, 2020, which is incorporated herein by reference in its entirety.

FIELD OF DISCLOSURE

The present disclosure relates to vehicles, and more particularly to a vehicle structure material strengthening system and a vehicle containing the same

BACKGROUND OF DISCLOSURE

As a means of transportation, safety of vehicles has always been one of the important indicators. For vehicles using aluminum alloys as a vehicle structure, aluminum alloys with different mechanical properties can generally be achieved through compositions of the aluminum alloy (such as 6000 series or 7000 series) and its heat treatment technology (such as T1, T3 or T6 heat treatment steps).

However, although the above-mentioned method has been very mature in the industry, there are still limitations in composition and heat treatment technology. Therefore, it is necessary to provide a vehicle structure material strengthening system and a vehicle containing the same to solve the problems of conventional technologies.

SUMMARY OF DISCLOSURE

An object of the present disclosure is to provide a vehicle structure material strengthening system, which improves a strength of a vehicle structure by applying a current to a vehicle when the vehicle is impacted.

Another object of the present disclosure is to provide a vehicle including the vehicle structure material strengthening system of the present disclosure, the vehicle structure material strengthening system can be mounted on existing vehicles (for example, mounted on a related equipment of existing auxiliary airbag), which can save costs.

To achieve the above object, the present disclosure provides a vehicle structure material strengthening system comprising: at least one collision sensor, a processor, and a power supply. The at least one collision sensor is suitable for being mounted on a vehicle. The processor is electrically connected to the at least one collision sensor for receiving a collision signal from the at least one collision sensor, wherein the processor determines whether to transmit a power activation signal according to the collision signal. The power supply is electrically connected to the processor and the vehicle. When the collision signal is greater than or equal to a collision threshold, the processor transmits the power activation signal to the power supply, wherein the power supply transmits a circuit to the vehicle according to the power activation signal; or when the collision signal is less than the collision threshold, the processor does not transmit the power activation signal.

In an embodiment of the present disclosure, the vehicle comprises at least one of a manned vehicle and an unmanned vehicle.

In an embodiment of the present disclosure, the manned vehicle comprises at least one of an automobile, a public transport carriage, a track vehicle, and an aircraft.

In an embodiment of the present disclosure, the manned vehicle is the automobile, and the power supply is electrically connected to at least one of an A-pillar, a B-pillar, and a C-pillar of the automobile.

In an embodiment of the present disclosure, the vehicle structure material strengthening system further comprises: at least one auxiliary airbag installed in the vehicle and electrically connected to the processor, wherein the processor determines whether to transmit an auxiliary airbag activation signal according to the collision signal, wherein: when the collision signal is greater than or equal to the collision threshold, the processor transmits the auxiliary airbag activation signal to the at least one auxiliary airbag, wherein the at least one auxiliary airbag is activated according to the auxiliary airbag activation signal; or when the collision signal is less than the collision threshold, the processor does not transmit the auxiliary airbag activation signal.

In an embodiment of the present disclosure, the at least one collision sensor comprises a plurality of collision sensors, and the plurality of collision sensors are dispersedly mounted on the vehicle.

In an embodiment of the present disclosure, the plurality of collision sensors are dispersedly mounted on an outer surface of the vehicle.

In an embodiment of the present disclosure, the at least one collision sensor comprises at least one of an electromechanical collision sensor, an electronic collision sensor, and a mercury switch collision sensor.

In an embodiment of the present disclosure, the power supply provides a current greater than 0 A and less than or equal to 500 A to the vehicle.

To achieve another object described above, the present disclosure provides a vehicle comprising a vehicle structure material strengthening system as described in any one of the above embodiments.

In an embodiment of the present disclosure, the vehicle comprises at least one of a manned vehicle and an unmanned vehicle.

In an embodiment of the present disclosure, the manned vehicle comprises at least one of an automobile, a public transport carriage, a track vehicle, and an aircraft.

In an embodiment of the present disclosure, the manned vehicle is the automobile, and the power supply is electrically connected to at least one of an A-pillar, a B-pillar, and a C-pillar of the automobile.

In an embodiment of the present disclosure, the vehicle structure material strengthening system further comprises: at least one auxiliary airbag installed in the vehicle and electrically connected to the processor, wherein the processor determines whether to transmit an auxiliary airbag activation signal according to the collision signal, wherein: when the collision signal is greater than or equal to the collision threshold, the processor transmits the auxiliary airbag activation signal to the at least one auxiliary airbag, wherein the at least one auxiliary airbag is activated according to the auxiliary airbag activation signal; or when the collision signal is less than the collision threshold, the processor does not transmit the auxiliary airbag activation signal.

In an embodiment of the present disclosure, the at least one collision sensor comprises a plurality of collision sensors, and the plurality of collision sensors are dispersedly mounted on the vehicle.

In an embodiment of the present disclosure, the plurality of collision sensors are dispersedly mounted on an outer surface of the vehicle.

In an embodiment of the present disclosure, the at least one collision sensor comprises at least one of an electromechanical collision sensor, an electronic collision sensor, and a mercury switch collision sensor.

In an embodiment of the present disclosure, the power supply provides a current greater than 0 A and less than or equal to 500 A to the vehicle.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, and etc., are only directions by referring to the accompanying drawings, and thus the used directional terms are used to describe and understand the present disclosure, but the present disclosure is not limited thereto.

It should be noted that mechanical properties of the vehicle structure are improved by applying a current to the vehicle. The above-mentioned method can make the vehicle structure have relatively strong ductility and strength when the vehicle is impacted, so as to prevent the vehicle structure from being broken due to the impact. The following will provide specific experimental analysis results to prove the feasibility.

Figure 1A:
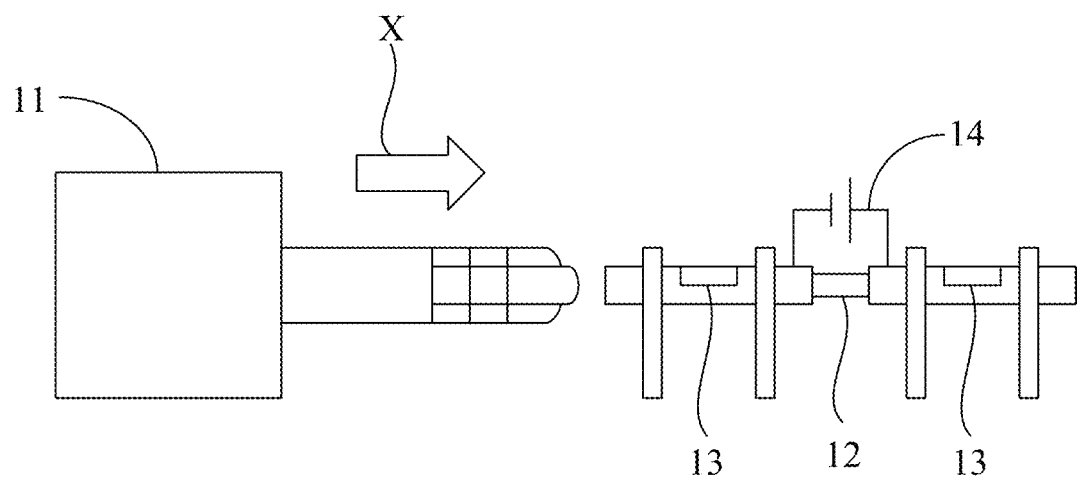
FIG. 1A is a schematic perspective view of a split Hopkinson pressure bar.

First, a 7000 series aluminum alloy (such as 7075 aluminum alloy) is provided, and the aluminum alloy is treated by a T6 heat treatment (7075 aluminum alloy and T6 heat treatment can be referred as to a conventional technology, which is not a main feature of the present disclosure). Next, using a split Hopkinson pressure bar 10 as shown in FIG. 1A, a strainer 11 (or a striker bar) is subjected to a high strain rate (for example, about 3000 s$^{-1}$) with a stress of about 10 kg/cm$^2$, and the AA7075-T6 aluminum alloy test piece 12 is impacted in the direction X to produce a compression deformation, and a strain gauge 13 is used to calculate the strain. After that, a stress-strain curve relationship and an average strain rate are calculated according to an one-dimensional wave propagation theory, and an influence of the current on the mechanical properties under the conditions of no circuit and energization of the power supply 14 (for example, about 3 to 7 A) is analyzed. Then, the material structure is analyzed (such as morphology, crystal phase, azimuth orientation, hardness, and elastic modulus).

Figure 1B:
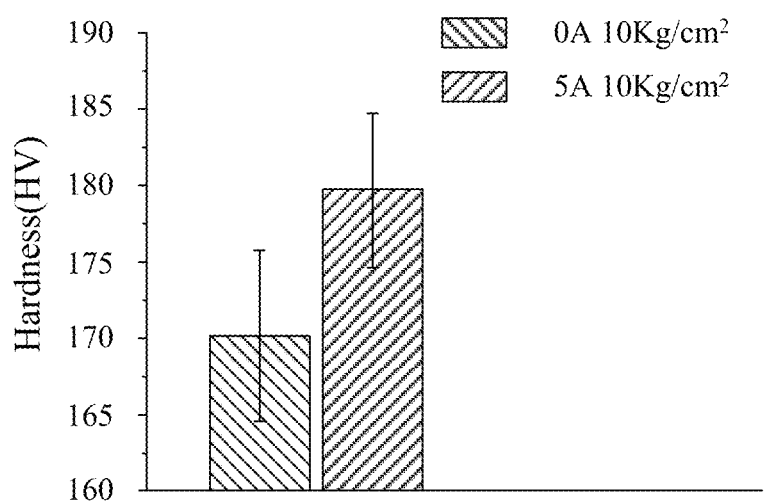
FIG. 1B is a schematic diagram of a hardness of an aluminum alloy showing different results under conditions of applying or not applying current.
Figure 1C:
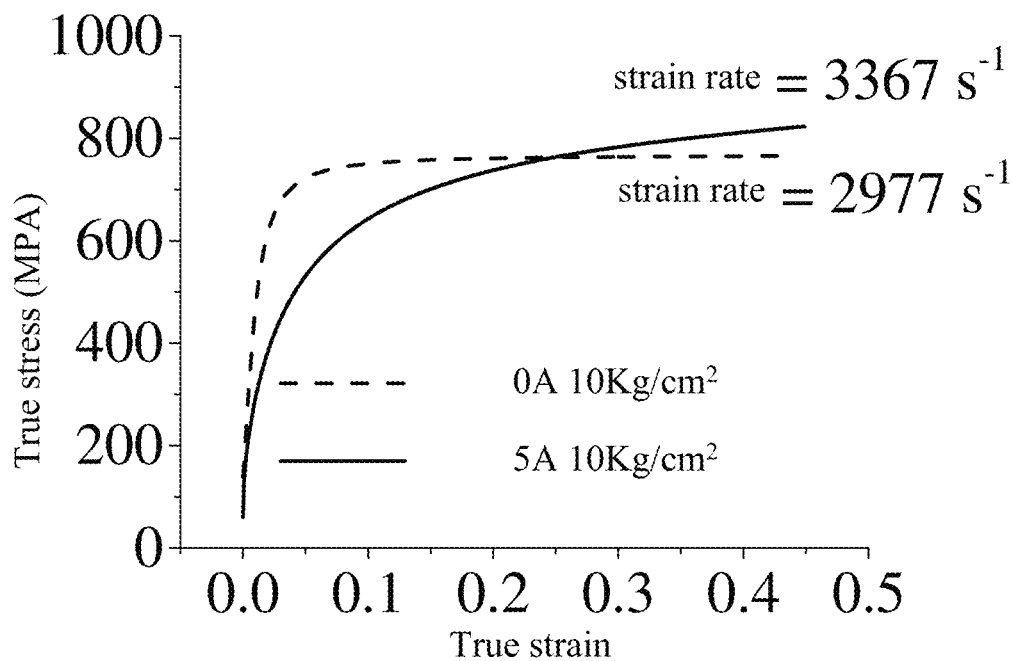
FIG. 1C is a schematic diagram of true stress and true strain of an aluminum alloy with no current applied and 5 A current applied.

The hardness of the aluminum alloy exhibits different results with or without current application, as shown in FIG. 1B. For example, compared with the case where no current is applied, the hardness of the aluminum alloy to which the current (5 A) is applied is higher. The average hardness of the aluminum alloy to which no applied current is applied and the average hardness of the aluminum alloy to which a current of 5 A is applied is 170.19±5.57 HV and 179.72±5.04 HV, respectively. In addition, as shown in FIG. 1C, a yield stress of the aluminum alloy to which a current of 5 A is applied is higher than that in the case where no current is applied. In addition, in this experiment, the aluminum alloy with no current applied is unable to withstand the impact and therefore rupture is caused, but the aluminum alloy to which current is applied has only plastic deformation.

Figure 1D:
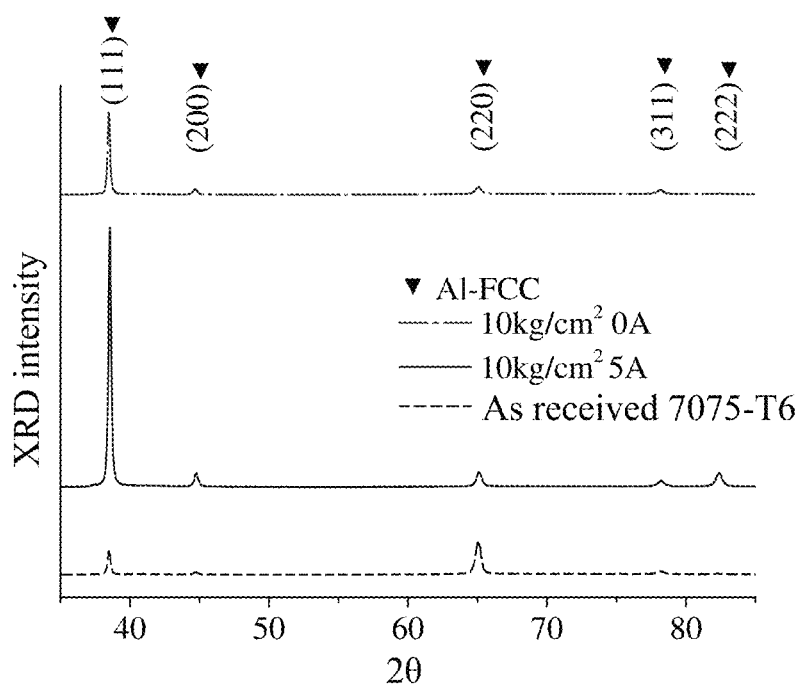
FIG. 1D is an XRD analysis diagram of AA7075-T6 before impact, after AA7075-T6 without current applied and impact, and AA7075-T6 after applying current (5 A) and impact.

Next, please referring to FIG. 1D, uniformly distributed (111) and (220) crystal planes of AA7075-T6 are switched to a specific orientation after impact, which is the closest packing slip plane (111). In addition, when a current is applied, a strong diffraction signal on the (111) plane will be generated after impact.

Figures 1E, 1F, 1G:
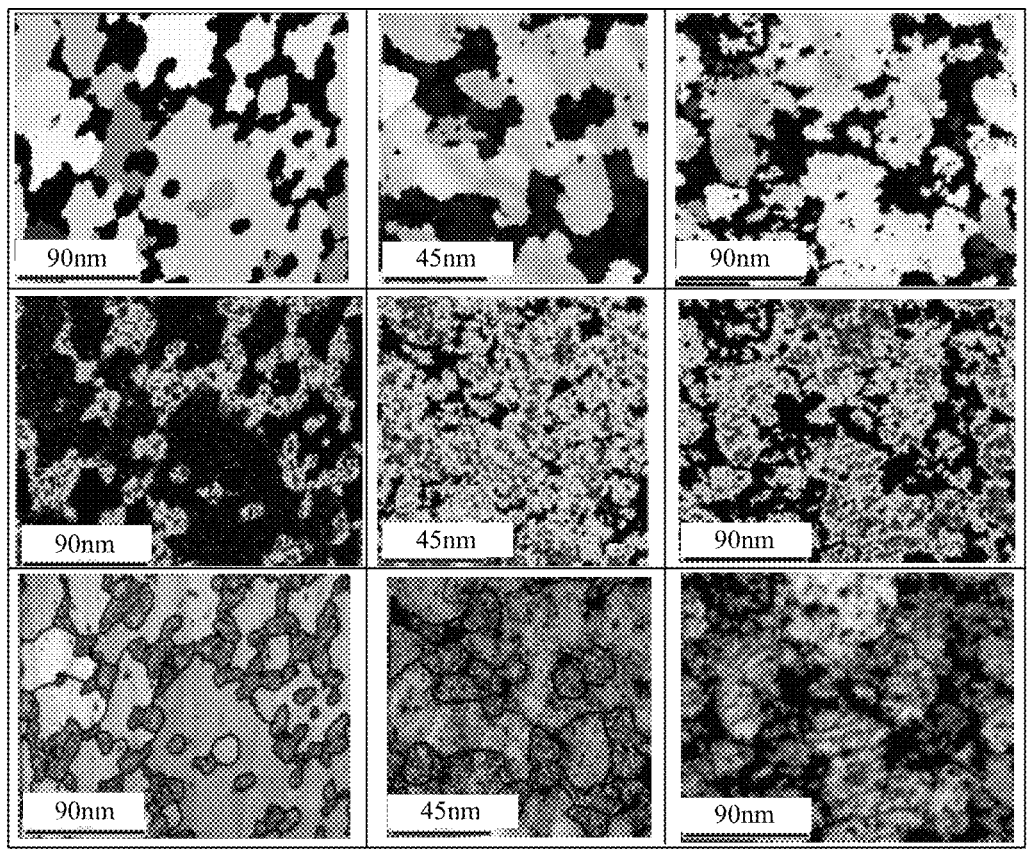
FIG. 1E is a crystallographic orientation map, a kernel average misorientation map, and a grain boundary map at a same position on a surface of an aluminum alloy before being impacted.
FIG. 1F is a crystallographic orientation map, a kernel average misorientation map, and a grain boundary map at a same position on a surface of an aluminum alloy after no current is applied and the aluminum alloy is impacted.
FIG. 1G is a crystallographic orientation map, a kernel average misorientation map, and a grain boundary map at a same position on a surface of an aluminum alloy after applying a current (about 5 A) and being impacted.
Figure 1H:
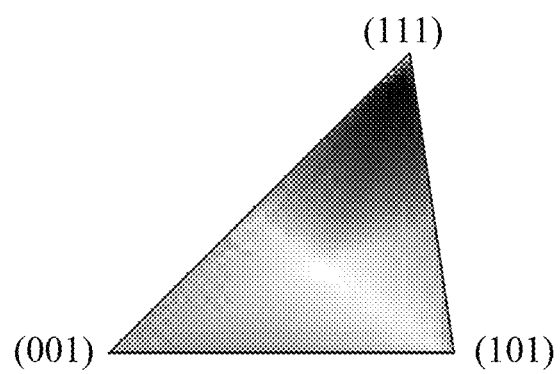
FIG. 1H is a corresponding indicator diagram for distinguishing the crystal planes of FIG. 1E to FIG. 1G by color (grayscale).

Refer to FIG. 1E to FIG. 1H. FIG. 1E is a crystallographic orientation map (upper diagram), a kernel average misorientation map (middle diagram), and a grain boundary map (lower diagram) at a same position on a surface of an aluminum alloy before being impacted. FIG. 1F is a crystallographic orientation map (upper diagram), a kernel average misorientation map (middle diagram), and a grain boundary map (lower diagram) at a same position on a surface of an aluminum alloy after no current is applied and the aluminum alloy is impacted. FIG. 1G is a crystallographic orientation map (upper diagram), a kernel average misorientation map (middle diagram), and a grain boundary map (lower diagram) at a same position on a surface of an aluminum alloy after applying a current (about 5 A) and being impacted. To further explain, the kernel average misorientation map (middle diagram) and the grain boundary map (lower diagram) are analyzed according to different measurement methods. Among them, the darker the color of the kernel average misorientation map (middle image), the larger the angle of the subgrain boundary (for example, light gray (or light black) is 0 to 5 degrees, and dark gray (or dark black) is 5 degrees or more). In the color of the grain boundary map (lower diagram), for example, light gray (or light black) is 0 to 2 degrees sub-grain boundaries, medium gray (or medium black) is 2 to 5 degrees sub-grain boundaries, dark gray (or dark black) is 5 degrees or more). In addition, the colors in FIG. 1H are used to correspond to the upper diagrams of FIG. 1E to FIG. 1G, which is used to determine the crystal planes at various positions in the upper diagrams of FIG. 1E to FIG. 1G. For example, light gray (or light black) indicates a position of the (101) plane, dark gray (or dark black) indicates a position of the (111) plane.

It can be seen from FIG. 1E and FIG. 1H that before the impact, grains of the (101) plane of the aluminum alloy surface are large, and there are a large number of low-angle subgrain boundaries inside the grains, and therefore the stress is high. In addition, the (111) plane grains are long and narrow, with sub-grain boundaries inside the (111) plane grains, and a small number of sub-grain boundaries with higher angles. From FIGS. 1F to 1G, it can be seen that an internal stress of the (101) plane after impact is less than an internal stress of the (111) plane regardless of whether current is applied or not, and the number of sub-grain boundaries in the crystal grain increases. In addition, after the current is applied and being impacted, the aluminum alloy produces low-angle (for example, about 5 degrees or less) subgrain boundaries in the grains of the (111) plane.

Figure 1I:
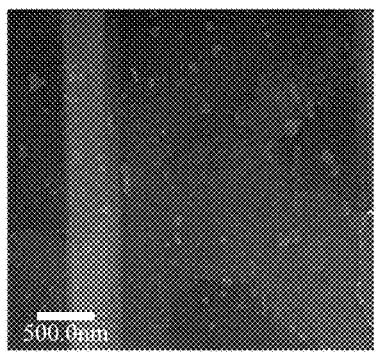
FIG. 1I to FIG. 1K are schematic diagrams of a transmission electron microscope of a surface of an aluminum alloy before impact, a surface of an aluminum alloy after no current is applied and the aluminum alloy is impacted, and a surface of an aluminum alloy after a current (about 5 A) is applied and the aluminum alloy is impacted.
Figure 1J:
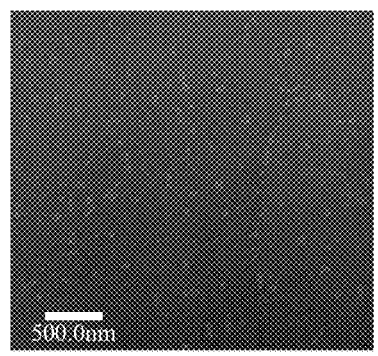
Figure 1K:
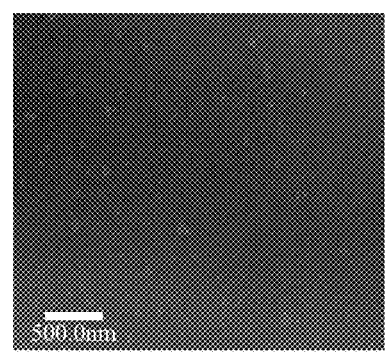

FIG. 1I to FIG. 1K are schematic diagrams of a transmission electron microscope of a surface of an aluminum alloy before impact, a surface of an aluminum alloy after no current is applied and the aluminum alloy is impacted, and a surface of an aluminum alloy after a current (about 5 A) is applied and the aluminum alloy is impacted. Compared with FIG. 1I to FIG. 1K, it can be seen that a smaller amount of precipitates formed along the secondary grain boundaries are observed in the aluminum alloy after the current is applied and impacted.

In an embodiment, a Split Hopkinson pressure bar as shown in FIG. 1A is used. The AA7075-T6 aluminum alloy test piece is hit at a high strain rate (e.g., about $3000s^{-1}$) with a stress of about 10 kg/cm$^2$, different applied currents (e.g., currents of 0 A, 3 A, 4 A, 5 A, 6 A, and 7 A) and different environmental temperatures (e.g., room temperature or 150° C.) to produce compression deformation. It can be seen from the experimental results that aluminum alloys without current applied (i.e., 0 A) will break at room temperature or 150° C., while aluminum alloys with currents of 3 A, 4 A, 5 A, 6 A, and 7 A are not broken.

According to the above, when a current is applied to the impacted metal (such as aluminum alloy), the mechanical properties of metals can be improved. In one embodiment, the current is greater than 0 A and less than or equal to 500 A, for example.

Figure 2:
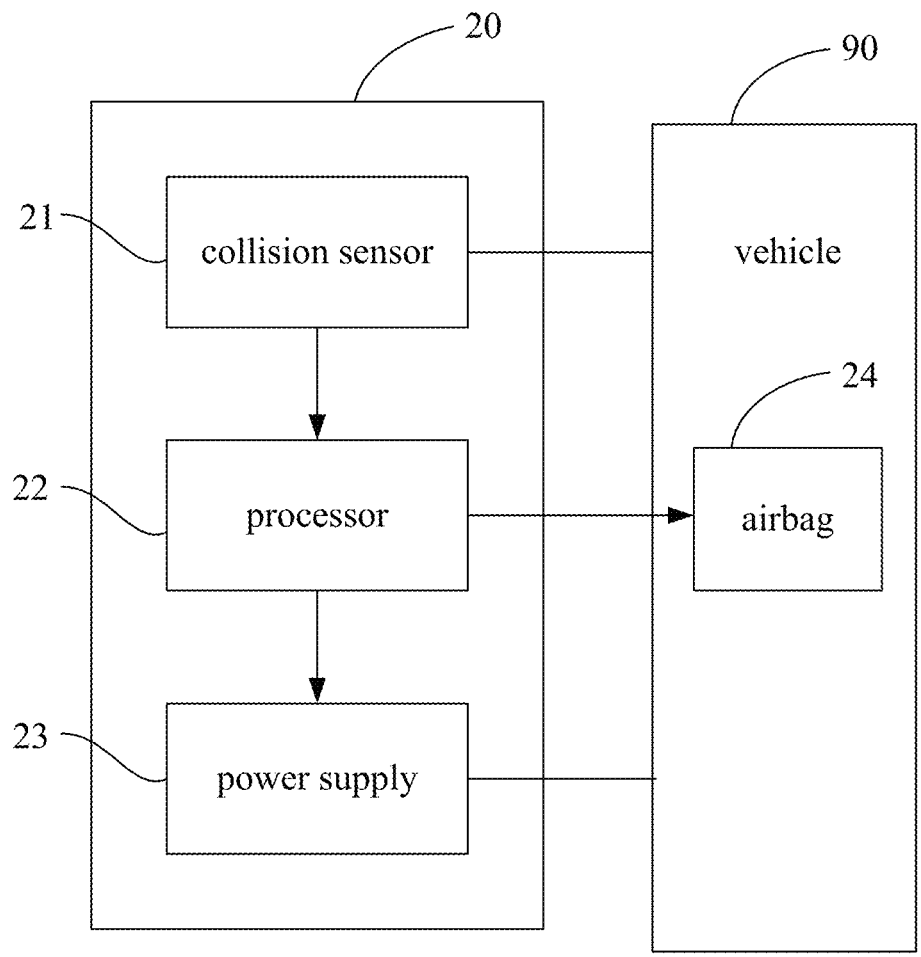
FIG. 2 is a block diagram of a vehicle structure material strengthening system according to an embodiment of the present disclosure.

Accordingly, referring to FIG. 2, an embodiment of the present disclosure provides a vehicle structure material strengthening system 20 comprising: at least one collision sensor 21, a processor 22, and a power supply 23. The at least one collision sensor 21 is suitable for being mounted on a vehicle 90. The processor 22 is electrically connected to the at least one collision sensor 21 for receiving a collision signal from the at least one collision sensor 21, wherein the processor 22 determines whether to transmit a power activation signal according to the collision signal. The power supply 23 is electrically connected to the processor 22 and the vehicle 90. When the collision signal is greater than or equal to a collision threshold, the processor 22 transmits the power activation signal to the power supply 23, wherein the power supply 23 transmits a circuit to the vehicle 90 according to the power activation signal; or when the collision signal is less than the collision threshold, the processor 22 does not transmit the power activation signal.

It can be seen from the above that the vehicle structure material strengthening system 20 of an embodiment of the present disclosure applies current to the vehicle by sensing that a collision occurs, thereby strengthening the structure of the vehicle. The principle of strengthening the vehicle structure can be proved through the above experimental results, so it is not repeated here again.

It should also be noted that although the above experimental results are based on AA7075-T6 aluminum alloy, it can actually be applied to other metals.

It is noted that the "vehicle" in this specification refers to a carriage, also called a transportation. Generally speaking, vehicles refer to equipment used for the transportation of people or goods. Animals and humans driven by human will for the above-mentioned purposes can also be called vehicles, including land, water, air, underwater, space, etc., which are all used by vehicles. In an embodiment of the present disclosure, the vehicle includes at least one of a manned vehicle and an unmanned vehicle. In one example, the manned vehicle includes at least one of an automobile, a public transport carriage, and a track vehicle. In a specific example, the automobile is, for example, a vehicle (including a motorcycle) that runs on the road with its power does not follow the track or power line, such as a two-wheeled motorcycle, a vehicle with four or more wheels (for example, according to the classification, it includes: trucks, buses, military vehicles, racing automobiles, special vehicles, engineering vehicles, recreation vehicles, private automobiles, vans, cross-border recreational vehicles (CRV) and sports automobiles. In another example, the public transportation carriage includes mass rapid transit (MRT), train, high-speed rail, maglev train, etc. In another example, the aircraft includes an airplane. In another aspect, the unmanned vehicle refers to, for example, a vehicle, an aircraft, a ship, or a combination of unmanned transportation vehicles that operate through remote control or automatic operation. In a specific example, the unmanned vehicle includes a drone, a remote-control vehicle, a remote-control boat, or a remote-control submarine, for example.

In one embodiment, the vehicle structure material strengthening system of the present disclosure is suitable for a situation where the vehicle is moving at a high speed, or when the vehicle is moving at a relatively high speed with another object that may collide. In this embodiment, the vehicle structure material strengthening system of the present disclosure can improve the strength and ductility of the vehicle structure to avoid or reduce the breakage of the vehicle.

Figure 3:
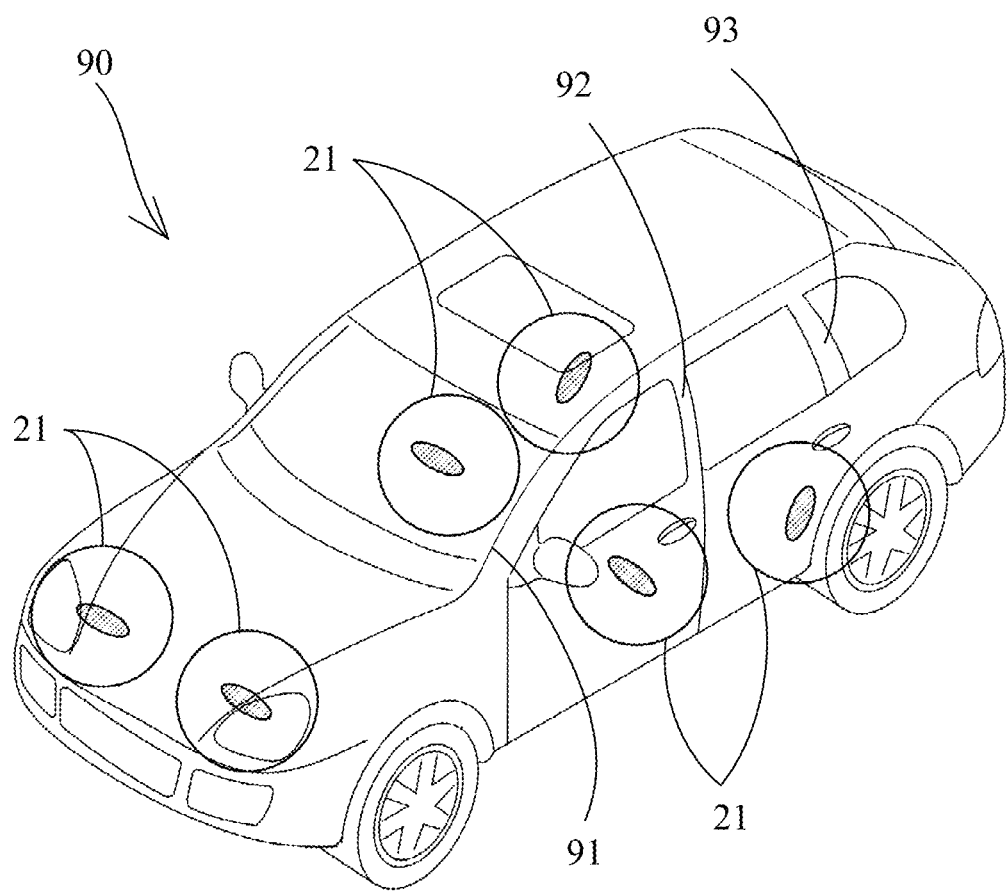
FIG. 3 is a schematic diagram of collision sensors and an A-pillar, a B-pillar, and a C-pillar.

Taking an automobile as an example, as shown in FIG. 3, the power supply 23 is electrically connected to at least one of an A-pillar 91, a B-pillar 92, and a C-pillar 93 of the automobile, for example. It should be mentioned that, as shown in FIG. 3, the A-pillar 91 is between a windshield and left and right front doors; the B-pillar 92 is between a front seat and a rear seat; and the C-pillar 93 is on both sides of rear seat headrests. In one embodiment, positive and negative electrodes of the power supply 23 are electrically connected to head and tail ends of the A-pillar 91 (and/or B-pillar 92, and/or C-pillar 93) of the automobile, so that the entire A-pillar 91 (and/or B-pillar 92 and/or C-pillar 93) can be affected by current to improve mechanical properties.

In an embodiment, a part or the whole of the vehicle structure material strengthening system 20 of an embodiment of the present disclosure may be used in conjunction with a part or the whole of the existing auxiliary airbag system. For example, the at least one collision sensor 21 and/or the processor 22 may be a component of an existing auxiliary airbag system; or, at least one collision sensor 21 and/or the processor 22 in the vehicle structure material strengthening system 20 of an embodiment of the present disclosure may be used as a component of an existing auxiliary airbag system. In an embodiment, the power supply 23 in the vehicle structure material strengthening system 20 of an embodiment of the present disclosure can also be an existing power supply in the vehicle 90 (for example, a battery used when an automobile is started).

In an example, the vehicle structure material strengthening system 20 of an embodiment of the present disclosure comprises at least one auxiliary airbag 24. The at least one auxiliary airbag 24 can be installed in the vehicle 90 and electrically connected to the processor 22, wherein the processor 22 determines whether to transmit an auxiliary airbag activation signal according to the collision signal, wherein: when the collision signal is greater than or equal to the collision threshold, the processor 22 transmits the auxiliary airbag activation signal to the at least one auxiliary airbag 24, wherein the at least one auxiliary airbag 24 is activated according to the auxiliary airbag activation signal; or when the collision signal is less than the collision threshold, the processor 22 does not transmit the auxiliary airbag activation signal. It can be seen from the above that the at least one auxiliary airbag 24 is also activated when the collision signal is greater than or equal to the collision threshold, so that the at least one auxiliary airbag 24 is inflated to protect a user in the vehicle 90. In an example, the at least one auxiliary airbag 24 may be installed in a steering wheel. In a specific example, number of the at least one auxiliary airbag 24 may be multiple, and the auxiliary airbags 24 may be dispersedly mounted in the vehicle 90.

It is noted that the collision threshold mentioned in this article can be a setting value. For example, the collision signal of the collision sensor 21 can be collected through multiple collision tests, and the setting value can be determined according to the damage to the vehicle and/or the user during the collision test. In an embodiment, the collision threshold may be a collision threshold used in an existing auxiliary airbag system.

In an embodiment, the at least one collision sensor 21 comprises a plurality of collision sensors 21, and the plurality of collision sensors 21 are dispersedly mounted on the vehicle 90. In an example, as shown in FIG. 3, the collision sensors 21 are dispersedly mounted on an outer surface of the vehicle 90. In another example, a position of the at least one collision sensor 21 may adopt a position of the collision sensor in the existing auxiliary airbag system.

In an embodiment, the at least one collision sensor 21 comprises at least one of an electromechanical collision sensor, an electronic collision sensor, and a mercury switch collision sensor. The electromechanical collision sensor mainly uses mechanical motion to make the electrical contacts open/disconnect to generate a collision signal. The electronic collision sensor mainly uses a deformation of the strain resistor during collision to change a resistance value or enforce a piezoelectric crystal, so as to generate an output voltage change to generate the collision signal. The mercury switch collision sensor mainly uses conductive properties of mercury to generate a collision signal.

It can be seen from the above that the vehicle structure material strengthening system 20 according to an embodiment of the present disclosure strengthens the mechanical properties of the vehicle structure by applying a current to the vehicle 90. The above-mentioned method can make the vehicle structure have stronger ductility and strength when the vehicle 90 is impacted, so as to prevent the vehicle structure from being broken due to the impact. In addition, components in the vehicle structure material strengthening system 20 according to an embodiment of the present disclosure can be partially or completely provided by the components of the existing vehicle. Alternatively, the vehicle structure material strengthening system 20 according to an embodiment of the present disclosure can be directly mounted on an existing vehicle, so there is no need to greatly modify the existing vehicle. In addition, there is no need to change materials used in the existing vehicle structure.

In addition, it is noted that the prior art does not disclose any technology that determines whether to apply current to the vehicle according to the relationship between the collision signal and the collision threshold during a collision. It is worth mentioning that when a current is applied to the vehicle, the current will only flow from the outer surface (such as a metal surface) of the vehicle, so the user in the vehicle will not receive an electric shock. The above-mentioned principle can refer to the situation that when the automobile is struck by lightning, the user in the vehicle will not be electrically shocked.

Further, the present disclosure further provides a vehicle 90 including the vehicle structure material strengthening system 20 as in any one of the above-mentioned embodiments. In an embodiment, the vehicle 90 may be an existing vehicle and equipped with the vehicle structure material strengthening system 20 of any one of the above embodiments.

The present disclosure has been described with a preferred embodiment thereof and it is understood that many changes and modifications to the described embodiment can be carried out without departing from the scope and the spirit of the disclosure that is intended to be limited only by the appended claims.

The invention claimed is:

1. A vehicle structure material strengthening system, comprising:
   at least one collision sensor suitable for being mounted on a vehicle;
   a processor electrically connected to the at least one collision sensor for receiving a collision signal from the at least one collision sensor, wherein the processor determines whether to transmit a power activation signal according to the collision signal; and
   a power supply electrically connected to the processor and the vehicle,
   wherein:
      when the collision signal is greater than or equal to a collision threshold, the processor transmits the power activation signal to the power supply, wherein the power supply transmits a circuit to the vehicle according to the power activation signal, such that a current is applied to metal of the vehicle, thereby improving mechanical properties of the metal; and
      when the collision signal is less than the collision threshold, the processor does not transmit the power activation signal.

2. The vehicle structure material strengthening system according to claim 1, wherein the vehicle comprises at least one of a manned vehicle and an unmanned vehicle.

3. The vehicle structure material strengthening system according to claim 2, wherein the manned vehicle comprises at least one of an automobile, a public transport carriage, a track vehicle, and an aircraft.

4. The vehicle structure material strengthening system according to claim 3, wherein the manned vehicle is the automobile, and the power supply is electrically connected to at least one of an A-pillar, a B-pillar, and a C-pillar of the automobile.

5. The vehicle structure material strengthening system according to claim 3, further comprising:
at least one auxiliary airbag installed in the vehicle and electrically connected to the processor, wherein the processor determines whether to transmit an auxiliary airbag activation signal according to the collision signal, wherein:
when the collision signal is greater than or equal to the collision threshold, the processor transmits the auxiliary airbag activation signal to the at least one auxiliary airbag, wherein the at least one auxiliary airbag is activated according to the auxiliary airbag activation signal; or
when the collision signal is less than the collision threshold, the processor does not transmit the auxiliary airbag activation signal.

6. The vehicle structure material strengthening system according to claim 1, wherein the at least one collision sensor comprises a plurality of collision sensors, and the plurality of collision sensors are dispersedly mounted on the vehicle.

7. The vehicle structure material strengthening system according to claim 6, wherein the plurality of collision sensors are dispersedly mounted on an outer surface of the vehicle.

8. The vehicle structure material strengthening system according to claim 1, wherein the at least one collision sensor comprises at least one of an electromechanical collision sensor, an electronic collision sensor, and a mercury switch collision sensor.

9. The vehicle structure material strengthening system according to claim 1, wherein the power supply provides the current greater than OA and less than or equal to 500 A to the vehicle.

10. A vehicle, comprising a vehicle structure material strengthening system according to claim 1.

11. The vehicle according to claim 10, wherein the vehicle comprises at least one of a manned vehicle and an unmanned vehicle.

12. The vehicle according to claim 11, wherein the manned vehicle comprises at least one of an automobile, a public transport carriage, a track vehicle, and an aircraft.

13. The vehicle according to claim 12, wherein the manned vehicle is the automobile, and the power supply is electrically connected to at least one of an A-pillar, a B-pillar, and a C-pillar of the automobile.

14. The vehicle according to claim 12, further comprising:
at least one auxiliary airbag installed in the vehicle and electrically connected to the processor, wherein the processor determines whether to transmit an auxiliary airbag activation signal according to the collision signal, wherein:
when the collision signal is greater than or equal to the collision threshold, the processor transmits the auxiliary airbag activation signal to the at least one auxiliary airbag, wherein the at least one auxiliary airbag is activated according to the auxiliary airbag activation signal; or
when the collision signal is less than the collision threshold, the processor does not transmit the auxiliary airbag activation signal.

15. The vehicle according to claim 10, wherein the at least one collision sensor comprises a plurality of collision sensors, and the plurality of collision sensors are dispersedly mounted on the vehicle.

16. The vehicle according to claim 15, wherein the plurality of collision sensors are dispersedly mounted on an outer surface of the vehicle.

17. The vehicle according to claim 10, wherein the at least one collision sensor comprises at least one of an electromechanical collision sensor, an electronic collision sensor, and a mercury switch collision sensor.

18. The vehicle according to claim 10, wherein the power supply provides the current greater than OA and less than or equal to 500 A to the vehicle.

* * * * *